United States Patent [19]

Nakazawa et al.

[11] Patent Number: 5,276,313
[45] Date of Patent: Jan. 4, 1994

[54] RADIOGRAPHIC IMAGE DATA RECORDING AND READING APPARATUS

[75] Inventors: Masayuki Nakazawa; Motoharu Tsuchiya; Akiko Yanagita; Hisanori Tsuchino, all of Hino, Japan

[73] Assignee: Konica Corporation, Tokyo, Japan

[21] Appl. No.: 902,968

[22] Filed: Jun. 23, 1992

[30] Foreign Application Priority Data

Jul. 1, 1991 [JP] Japan ................ 3-185809

[51] Int. Cl.⁵ .......................... G01N 23/04
[52] U.S. Cl. ................................ 250/582
[58] Field of Search ............. 350/327.2; 378/117

[56] References Cited

U.S. PATENT DOCUMENTS

| | | | |
|---|---|---|---|
| 4,597,094 | 6/1986 | Kleinman | 378/116 |
| 4,739,480 | 4/1988 | Oono et al. | 378/166 |
| 4,768,099 | 8/1988 | Mukai | 358/257 |
| 5,001,569 | 3/1991 | Shigyo | 358/296 |
| 5,027,274 | 6/1991 | Takayanagi | 250/327.2 D |
| 5,049,747 | 9/1991 | Hishinuma | 250/327.2 |
| 5,056,365 | 10/1991 | Gray et al. | 378/117 |
| 5,111,044 | 5/1992 | Agano | 250/327.2 |

FOREIGN PATENT DOCUMENTS

| | | |
|---|---|---|
| 48-80487 | 10/1973 | Japan . |
| 48-80489 | 10/1973 | Japan . |
| 53-39277 | 4/1978 | Japan . |
| 54-47883 | 4/1979 | Japan . |
| 55-12142 | 1/1980 | Japan . |
| 55-12143 | 1/1980 | Japan . |
| 55-12144 | 1/1980 | Japan . |
| 55-12145 | 1/1980 | Japan . |
| 55-84389 | 6/1980 | Japan . |
| 55-160078 | 12/1980 | Japan . |
| 58-72040 | 4/1983 | Japan . |
| 59-38278 | 3/1984 | Japan . |
| 59-155487 | 9/1984 | Japan . |
| 59-192240 | 10/1984 | Japan . |
| 60-256131 | 12/1985 | Japan . |
| 61-72087 | 4/1986 | Japan . |
| 61-228400 | 10/1986 | Japan . |
| 62-2769 | 1/1987 | Japan . |
| 63-37769 | 2/1988 | Japan . |

Primary Examiner—Carolyn E. Fields
Attorney, Agent, or Firm—Frishauf, Holtz, Goodman & Woodward

[57] ABSTRACT

A radiographical image reader for photoelectrically reading a radiographical image of an object. The image reader comprises a radioactive ray irradiator; a radiographical image converting panel which is a radioactive ray absorbent for absorbing the radioactive ray transmitted through through the object so that a radiographical image information is obtained; a scanner to scan the converting panel with exciting light so that the converting panel is subjected to stimulated emission; a reader to read the stimulated emission of the converting panel so that the radiographical image is obtained; a first memory to store at least one of a radioactive ray irradiating condition, object information, and image identification code; a second memory to store a radiographical image information; and a circuit to control the functions of the reader, the first memory, and the second memory in accordance with said irradiation of the radioactive ray by the irradiator.

7 Claims, 7 Drawing Sheets

RADIOGRAPHIC IMAGE DATA RECORDING AND READING APPARATUS

BACKGROUND OF THE INVENTION

The present invention relates to a radiographic image data recording and reading apparatus designed in a manner such that: a radiographic image storage panel having a stimulable phosphor is irradiated with radioactive rays which have transmitted a subject so that radiographic image information is recorded; and the radiographic image storage panel is scanned with stimulating light so that the recorded radiographic image information is photoelectrically read out.

In a conventional radiographic image data recording and reading apparatus, operations are conducted as follows. An additional information, which is a radioactive ray irradiating condition, object information, is inputted, and recorded correspondingly to an identification code marked on a radiographic image storage panel. After that, the identification on the radiographic image storage panel is read out with an image playback device. According to the result, photographing data stored in a memory means is detected. (Refer to the official gazette of Japanese Patent Application Open to Public Inspection No. 72040/1983.)

According to the technology disclosed in the aforementioned official gazette, image data and photographing data are linked with each other through the identification code on the radiographic image storage panel. Therefore, there is a possibility that image data and photographing data are not linked appropriately when the identification code is erased, or when an error is caused in the reading-out process, or when a mistake occurs in an inputting operation. Further, the cost of the apparatus is increased.

It is a primary object of the present invention to provide a compact radiographic image data reading apparatus in which image data and photographing data can be positively linked with each other.

SUMMARY OF THE INVENTION

In order to accomplish the aforementioned object, the present invention is to provide a radiographic image data reading apparatus designed in a manner such that: a radiographic image storage panel having a stimulable phosphor is irradiated with radioactive rays which have transmitted through a object such as a human body so that radiographic image information is recorded; and the radiographic image storage panel is scanned with stimulating light so that the recorded radiographic image information is photoelectrically read out. The aforementioned radiographic image data reading apparatus comprises a radioactive ray irradiation detecting means which detects the irradiation of radioactive rays, an additional information inputting means which inputs at least one of a radioactive ray irradiating condition, object information and image identification code, a memory means which stores radiographical image information, and a control means which controls a reading-out operation of radiographic image information and also controls a storing operation of the memory means in which radiographic image information and additional information are linked with each other, in accordance with the irradiation of radioactive rays.

In the present invention, in accordance with the irradiation of radioactive rays, a reading-out operation of radiographical image information, and a storing operation of a memory means in which radiographic image information and additional information are linked with each other, are conducted. Therefore, radiographic photographing data and image data are positively stored, being linked with each other, wherein the identification code on the radiographic image storage panel is not used. Consequently, the structure of the apparatus becomes simple and compact, so that it is possible to use the apparatus on a mobile van for a mass screening.

DETAILED DESCRIPTION OF THE INVENTION

Radioactive irradiation detection means 1 detects the irradiation of radioactive rays irradiated on a photographic object. The radioactive irradiation detection means 1 is preferably linked with an irradiation switch of a radioactive ray generator.

Figure 1:
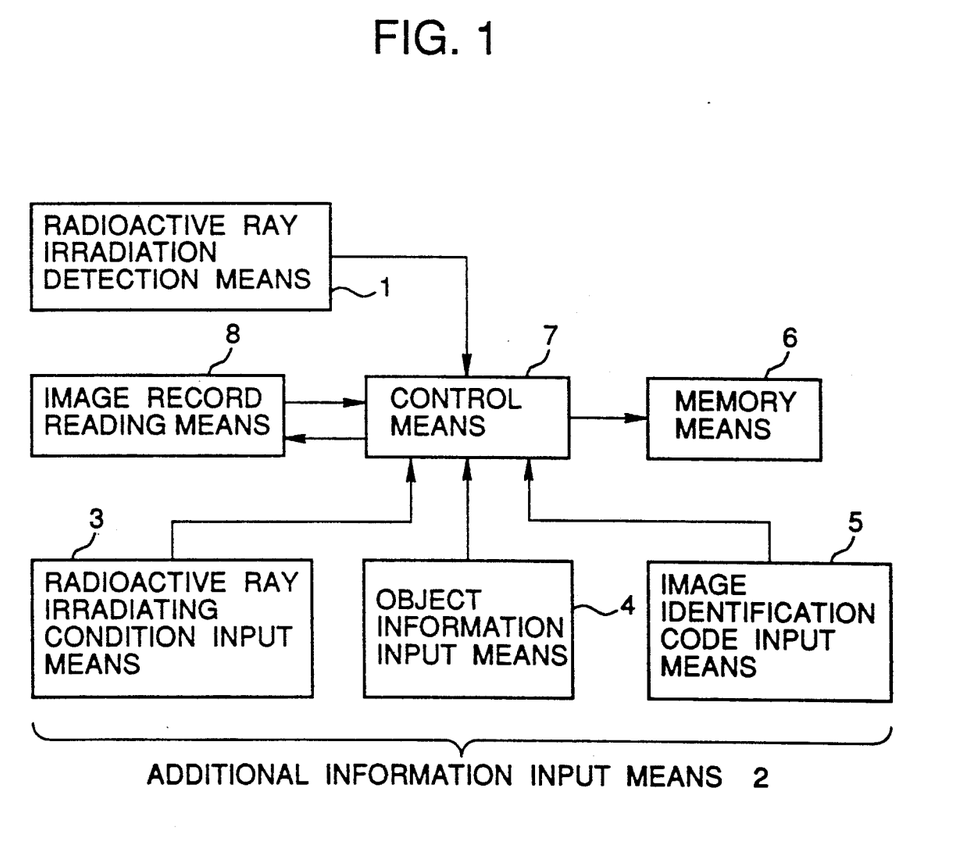
FIG. 1 is a block diagram of the radiographic image data reading apparatus of the present invention.

An additional information input means 2 inputs at least one of a radioactive ray irradiating condition, object information and an image identification code. As shown in FIG. 1, a radioactive ray irradiating condition input means 3, a object information input means 4 and an image identification code input means 5 are preferably combined so that the additional information input means 2 is constituted. However, in the present invention, one of the three means may be used to constitute the additional information input means 2, or two of them may be combined.

The radioactive irradiating condition input means 3 may be constituted as follows:

(1) Information such as voltage impressed upon an irradiation ray generating tube, current which flows in the tube and irradiation time, is automatically inputted according to the states of the irradiation switch and dial of the radioactive ray generator, and further according to control signals which control radioactive ray generation.

(2) For example, an infrared range finder is utilized, and a distance between a focal point of the tube of the radioactive ray generator and a photographic object is automatically measured. Then, the obtained information is automatically inputted.

(3) A dosimeter is utilized, and the result of the measurement is automatically inputted.

Furthermore, the above structures may be combined.

Object information such as names of objects, dates of their birth, sex distinction, their addresses, their identification codes and their history of medical examination, is inputted with the object information input means 4.

The object information input means 4 is constituted as follows:

(1) Object information is manually inputted with a keyboard.
(2) Object information recorded on a magnetic card is inputted with a magnetic card reader.
(3) Information is automatically inputted with an optical, mechanical or magnetic means, for example, information is optically read using bar codes.
(4) A data base of object information is provided, and some pieces of information are inputted with the above methods (1) to (3). On the basis of the aforementioned information, other information is automatically searched so that the necessary information is automatically inputted.

Furthermore, the above structures may be combined.

The image identification code inputted with the image identification code input means 5, is used to identify the image, that is, the image identification code is peculiar to each image. For example, the image identification code is composed of letters or numerals, so that it can be used as a key when an image is sought.

The image identification code input means 5 is constituted as follows:

(1) The image identification code is manually inputted with a keyboard.
(2) The image identification code is automatically generated.
(3) The image identification code is automatically inputted with an optical, mechanical or magnetic means.

Furthermore, the above structures may be combined.

In the image recording and reading means 8, a recording unit and a reading unit are integrally formed. The recording unit records radiographic image information which is obtained by irradiating a radioactive ray transmitted through an object onto a radiographic image storage panel having a stimulable phosphor layer. The reading unit photoelectrically reads the radiographic image information, recorded in the radiographic image storage panel, by scanning the radiographic image storage panel with stimulating light. The structure may be adopted in which the radiographic image storage panel is conveyed between the recording and reading units. (Refer to the official gazettes of Japanese Patent Application Laid Open Nos. 192240-1984 and 256131-1985.) However, it is preferable to adopt a structure in which the radiographic image storage panel is fixed and the exciting light scanning and photoelectrical converting means is moved. (Refer to the official gazettes of Japanese Patent Application Laid Open No. 2769-1987.)

The memory means 6 is provided to store radiographic images. Magnetic tapes, magnetic disks, optical disks and IC memory are used for the memory means 6. Rewritable magneto-optical disks of large capacity are preferably used. A plurality of different kinds of recording media may be combined.

The control means 7 controls conducting a reading operation to read a radiographical image in accordance with irradiation of radioactive rays, and further controls storing radiographical image information and additional information to be stored on the memory means 6, wherein radiographic image information and additional information are stored so that they can correspond to each other.

The manner in which radiographic image information and additional information are stored so that they can correspond to each other, is described as follows: Radiographic image information and additional information are stored in such a manner that at least one of them is designated, the other can be automatically searched when the stored information is read out.

When radiographic image information and additional information are stored under the condition that they belong to the same file, both of them can be easily read out. The name of the file or information stored in the file may be used as a retrieving key. The image identification code is preferably used as the name of the file.

In the case where radiographic image information and additional information are stored in different files, a file may be made in which the correspondence between the two files is stored, at least one of the file names may be stored in the other file, or both of them may be provided with a common retrieving key, for example, both of them may be provided with an image identification code.

The retrieving method is not limited to the aforementioned methods. A common automatic retrieving method may be adopted in which a retrieving operation is conducted with a computer when at least one of them is designated.

The recording medium may be the same or different. Information is most preferably stored in the same recording medium with the same file name.

Conducting a reading operation of a radiographic image in accordance with irradiation of radioactive rays and storing information in the memory means, are defined as: the reading operation of the radiographic image and the storing operation are sequentially conducted in the order in which radioactive rays are irradiated. A period of time from the irradiation of radioactive rays to the start of the reading operation may not be constant at each image. However, it is preferable that the reading and storing operations are started after a constant period time has transmitted through, or immediately after the irradiation of radioactive rays, the reading operation may be started.

Figure 2:
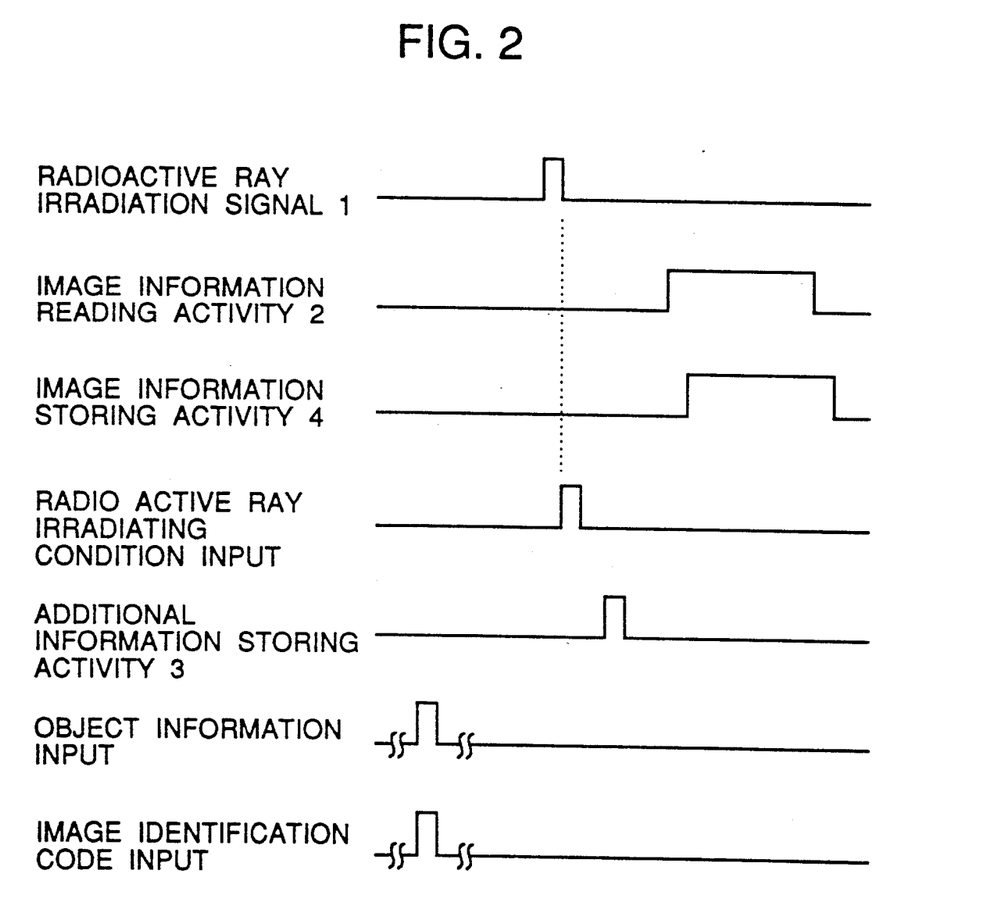
FIG. 2 is a time chart showing an example of the operation of the control means 7.

An example of the operation of the control means 7 is shown in FIG. 2. Radioactive ray irradiation signal 1 is received from the radioactive ray irradiation detection means 1. After a predetermined period of time has transmitted through, image information reading activity 2, in additional information storing activity 3 and image information storing activity 4, additional information and image information are related to each other.

In this example, image information storing activity 4 is conducted concurrently with image information reading activity 2. Either of additional information storing activity 3 or image information storing activity 4 may be started first.

Input of additional information such as radioactive ray irradiating condition, object information and image identification code may be conducted in accordance with radioactive ray irradiation, or it may be conducted independently from radioactive ray irradiation. In the example shown in FIG. 2, image identification code input and object information input are conducted before radioactive ray irradiation, and input of radioactive ray irradiating condition is conducted in accordance with radioactive ray irradiation. In the case where input of additional information is conducted before radioactive ray irradiation, it is preferable that the additional information can be corrected until radioactive ray irradiation. When radioactive ray irradiation has been conducted, the content of the additional information is preferably determined and stored.

As explained above, it is preferable that image information reading activity 2 is started when a predetermined period of time has elapsed after radioactive ray irradiation signal 1 was received, which is disclosed in Japanese Patent Application Open to Public Inspection No. 37769/1988, because it is effective to prevent the influence of "instantaneous-after-glow" and "fading in the dark" which are caused in the radiographic image storage panel. That is, in the case of stimulable phosphor used for the radiographic image storage panel, instantaneous luminescence caused when radioactive rays are irradiated on the radiographic image storage panel, is not immediately extinguished even after radioactive ray irradiation has been stopped, so that the stimulable phosphor continues to emit light while the intensity of light is attenuated, which is referred to as "instantaneous-after-glow". In order to prevent the influence of "instantaneous-after-glow", it is necessary to read as late as possible. On the other hand, radioactive energy stored on the radiographic image storage panel is the largest immediately after irradiation, and attenuates gradually, which is referred to as "fading in the dark". In order to avoid the influence of "fading in the dark", it is best to read as soon as possible. Consequently, it is necessary to secure harmony between the two.

Therefore, the following method, which is disclosed in FIG. 8 of Japanese Patent Application Open to Public Inspection No. 37769/1988, is preferably adopted: When the radioactive ray irradiation switch is turned on, the grid driving motor is rotated. When the rotating speed of the grid has reached a predetermined value, radioactive rays are emitted from the radioactive ray generating source. An amount of the radioactive rays is detected with the radioactive ray detector. When the amount of radioactive rays has reached a predetermined value, radioactive ray irradiation is stopped. After a predetermined period of time has elapsed, the stimulating light scanning and photoelectrical converting unit starts to move so that image reading is conducted on the radiographic image storage panel. In this case, the period of time from radioactive ray irradiation to image reading is preferably 0.01 to 10 sec.

Further, when a positioning judgement means which judges whether the relative positional relation between the aforementioned object and the aforementioned radiographic image reading means is appropriate or not, and a warning means which gives a warning in accordance with the result of the positioning judgement means, are provided, the occurrence of positioning failure can be found immediately after photographing, and a warning is given by the warning means. Accordingly, the operator can immediately find the occurrence of positioning failure. In the case where the occurrence of positioning failure can not be found immediately, the object must come later to have a photograph taken again. However, when the occurrence of positioning failure is immediately found in the manner mentioned above, the photograph can be immediately taken on the spot, which is preferable. The control means of the present invention is structured in such a manner that images are stored in the memory means corresponding to the additional information in response to the irradiation of radioactive rays. However, when the control means is structured in such a manner that only images of appropriate positioning are stored in the memory means corresponding to the additional information, useless images are not stored in the memory means so that the memory capacity can be saved. Especially, in using the information once written on the medium can not be erased, such as an optical disk, it is important to prevent storing the information of useless images, when the positioning of which is not appropriate.

It is preferable to provide a radioactive ray irradiation condition determination means which determines an appropriate irradiation condition according to the body measurement information such as the height, weight or body thickness of a object, because an appropriate photographing condition can be set irrespective of the body type of a object so that a radioactive ray image of stable quality can be obtained. In the case where the radioactive ray irradiation condition is extremely different from an appropriate value, the diagnostic performance of the image is remarkably deteriorated so that a wrong diagnosis may be made, or the object must come again to have a photograph taken. Consequently, it is important to set an appropriate photographing condition. Since only images taken under an appropriate irradiating condition is stored in the memory means corresponding to the additional information, useless images are not stored in the memory means so that the memory capacity can be saved. Especially in using the information once written on the medium can not be erased such as an optical disk, it is important to prevent storing the information of useless images, when the positioning of which is not appropriate.

It is preferable to previously provide the body measurement information to the object data base together with other object information. It is also possible that the object information input means includes a body measurement information detection means which can detect the body measurement information immediately before photographing. For example, when the body thickness of a object is measured by measuring the distance from a reference location to the object, utilizing infrared rays, the radioactive irradiation condition can be set according to the latest body measurement information, so that it is advantageous in that the appropriate radioactive ray irradiation condition can be set even when the body type of a object is changed.

The stimulable phosphor utilized for the radiographic image storage panel works as follows: After the first light or radioactive rays of high energy have been irradiated on the radiographic image storage panel, stimulated luminescence is emitted in accordance with the amount of the first light or radioactive rays of high energy when the stimulable phosphor is stimulated optically, thermally, mechanically, chemically or electrically.

From the viewpoint of practical use, stimulable phosphor is preferably used which emits photo-stimulated luminescence when stimulating light, the wavelength of which is not less than 500 nm, is applied.

The following phosphors may be used as the stimulable phosphor.

(1) Phosphor represented by $BaSO_4:A_x$ disclosed in the official gazette of Japanese Patent Application Open to Public Inspection No. 80487/1973
(2) Phosphor represented by $SrSO_4:A_x$ disclosed in the official gazette of Japanese Patent Application Open to Public Inspection No. 80489/1973
(3) Phosphors represented by $Li_2B_4O_7:Cu$, Ag and the like disclosed in the official gazette of Japanese Patent Application Open to Public Inspection No. 39277/1978

(4) Phosphors represented by $Li_2O.(B_2O_2):Cu$, $Li_2O.(B_2O_2):Cu$, $Ag$ and the like disclosed in the official gazette of Japanese Patent Application Open to Public Inspection No. 47883/1979

(5) Phosphors represented by SrS:Ce, Sm, SrS:Eu, Sm, $La_2O_2S$:Eu, Sm, (Zn, Cd)S:Mn, X disclosed in the official gazette of U.S. Pat. No. 3,859,527

(6) Phosphors such as Zn:Cu and Pb disclosed in the official gazette of Japanese Patent Application Open to Public Inspection No. 12142/1980

(7) Barium aluminate represented by $BaO.xAl_2O_3$:Eu disclosed in the official gazette of Japanese Patent Application Open to Public Inspection No. 12142/1980

(8) Phosphor of alkaline earth metal silicates represented by $M^{11}O.xSiO_2$:A disclosed in the official gazette of Japanese Patent Application Open to Public Inspection No. 12142/1980

(9) Phosphor represented by $(Ba_{1-x-y}Mg_xCa_y)FX:eEu^{2+}$ disclosed in the official gazette of Japanese Patent Application Open to Public Inspection No. 12143/1980

(10) Phosphor represented by LnOX:xA disclosed in the official gazette of Japanese Patent Application Open to Public Inspection No. 12144/1980

(11) Phosphor represented by $(Ba_{1-x}M^{11}x)FX$:yA disclosed in the official gazette of Japanese Patent Application Open to Public Inspection No. 12145/1980

(12) Phosphor represented by BaFX:xCe, yA disclosed in the official gazette of Japanese Patent Application Open to Public Inspection No. 84389/1980

(13) Phosphor of di-valent metal fluorohalide activated by rare earth metal represented by $M^{11}FX.xA$:yLn disclosed in the official gazette of Japanese Patent Application Open to Public Inspection No. 160078/1980

(14) Phosphor represented by ZnS:A, (Zn, Cd)S:A, CdS:A, ZnS:A, X, CdS:A, X disclosed in the official gazette of Japanese Patent Application Open to Public Inspection No. 160078/1980

(15) Phosphor represented by $xM_3(PO_4)_2.NX_2$:yA, $M_3(PO_4)_2$.yA disclosed in the official gazette of Japanese Patent Application Open to Public Inspection No. 38278/1984

(16) Phosphor represented by $nReX_3.mAX'_2:xEu$ $nReX_3.mAX'_2:xEu, ySm$ disclosed in the official gazette of Japanese Patent Application Open to Public Inspection No. 155487/1984

(17) Phosphor of alkalihalide represented by $M^1X.aM^{11}X'_2.bM^{111}X''_3$:cA disclosed in the official gazette of Japanese Patent Application Open to Public Inspection No. 72087/1986

(18) Phosphor of alkalihalide activated by bismuth represented by $M^1X$:xBi disclosed in the official gazette of Japanese Patent Application Open to Public Inspection No. 228400/1986

Among the aforementioned phosphors, alkalihalide phosphor is preferably used since a stimulable phosphor layer can be easily formed by the vapor depositing method or sputtering method.

However, the present invention is not limited to the aforementioned phosphors. Any stimulable phosphors can be used which emit stimulated luminescence when exciting light is irradiated after radioactive rays have been irradiated.

With reference to the attached drawings, examples of the present invention will be explained as follows. However, it should be understood that the present invention is not limited to the specific examples.

EXAMPLE 1

Figure 3:
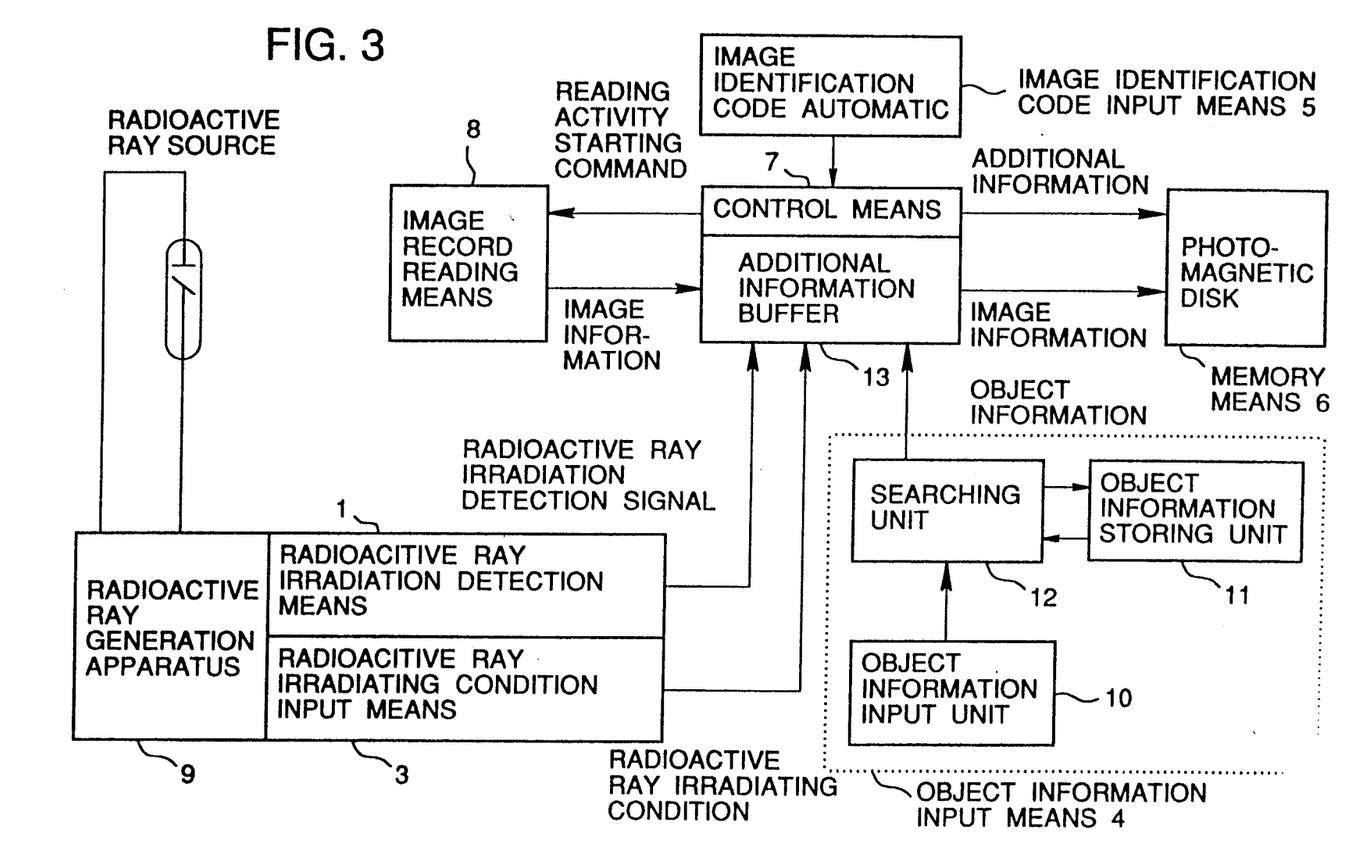
FIG. 3 is a block diagram of the radiographic image data reading apparatus relating to Example 1.

FIG. 3 is a block diagram of the radioactive image record reading apparatus according to the present invention. The radioactive ray irradiation detection means 1 is connected to the radioactive ray generation apparatus 9, and sends a radioactive ray irradiation detection signal to the control means 7 being linked with the irradiation switch.

The radioactive ray irradiating condition input means 3 is also connected to the radioactive ray generation apparatus 9, and information about X-ray tube voltage, X-ray tube current and irradiation period of time is sent to the control means 7.

The object information input means 4 includes the object information input unit 10, the object information storing unit 11 and the searching unit 12. The object information input unit 10 optically reads an individual identification code stored in the form of a bar code, and inputs the information. According to the individual identification code, the searching unit 12 searches the object information such as name, date of birth and sex distinction stored in the object information storing unit 11, and the searched information is sent to the control means 7.

In the image identification code input means 5, image identification codes constituted of letters and numerals are manually inputted through a keyboard so that the image identification codes are sent to the control means 7.

In the image record reading means 8, the radiographic image storage panel is fixed, and the stimulating light scanning means and photoelectric converting means are moved.

The memory means 6 includes an magneto-optical disk.

The control means 7 includes the additional information buffer 13 which temporarily stores information sent from the object information input means 4 and the image identification code input means 5. Information sent from the object information input means 4 and the image identification code input means 5, is determined at a point of time when the radioactive ray irradiation detection signal has been sent from the radioactive ray irradiation detection means 1.

The operation timing of the control means 7 is the same as that shown in FIG. 2.

EXAMPLE 2

Figure 4:
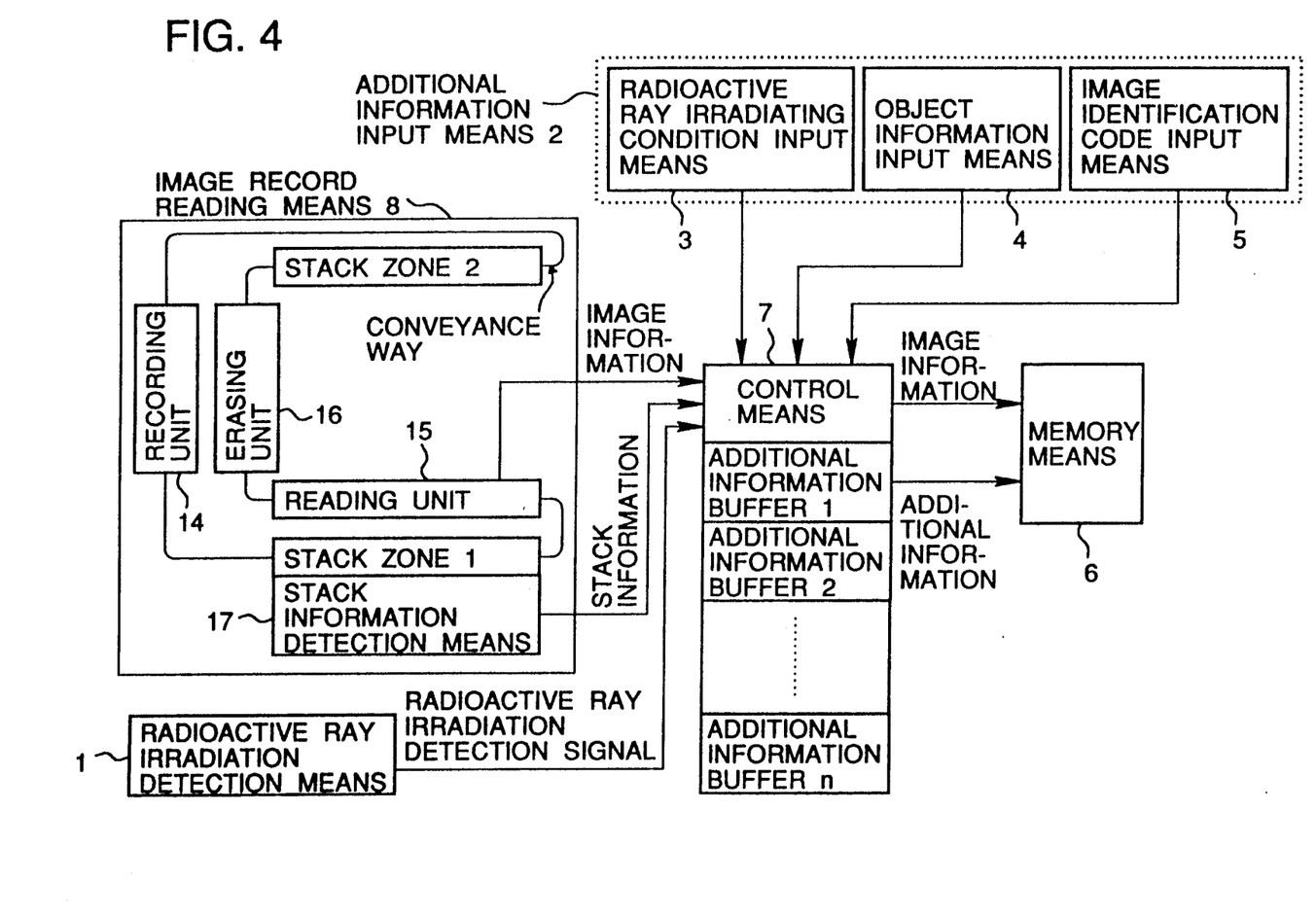
FIG. 4 is a block diagram of the radiographic image data reading apparatus relating to Example 2.

FIG. 4 is a block diagram of the radiographic image identification data reading apparatus according to the present invention. The additional information input means 2 (the radioactive ray irradiating condition input means 3, the object information input means 4 and the image identification code input means 5), the radioactive ray irradiation detection means 1 and the memory means 6 are constituted in the same manner as Example 1.

As described in the official gazette of Japanese Patent Application Open to Public Inspection No. 256131/1985, in the image record reading means 8, the radiographical image converting panel is conveyed in a group including the recording unit 14, the reading unit 15 and the erasing unit 16. The stack zone 1 in which n sheets of the radiographical image converting panels are stacked, is provided between the recording unit 14 and the reading unit 15, and also the stack zone 2 in which n sheets of the radiographical image converting panels are stacked, is provided between the recording unit 14 and the erasing unit 16.

The radiographic image storage panels stacked in the stack zones 1 and 2 are sent out in the order in which they were accommodated. Further, the stack information detection means 17 is provided which detects the number of the radiographic image storage panels stacked in the stack zone 1 disposed between the recording unit 14 and the reading unit 15, and sends the detected information to the control means 7.

The control means 7 includes the additional information buffers which temporarily store additional information sent from the additional information input means 2, wherein the number of the additional information buffers is the same as that of the radiographic image storage panels stacked in the stack zone disposed in the image record reading apparatus.

When the stack information detection means 17 sends information in which the number of the radiographical image converting panels stacked in the stack zone 1 is "m", additional information is stored in the (m+1)th additional information buffer, and when radioactive ray irradiation is detected, conveyance of the radiographic image storage panel is started.

The reading operations are conducted in the order in which the radiographic image converting panels are accommodated in the stack zone 1. Additional information stored in the additional information buffer 1, and image information are linked with each other and stored in the memory means 6. After additional information has been stored, the additional information stored in the "i"th additional information buffer "i" is sequentially transferred to the (i−1)th additional information buffer, and the information in the "n"th additional information buffer "n" is erased.

Due to the aforementioned operations, image information and additional information are positively linked with each other and stored.

EXAMPLE 3

Figure 5:
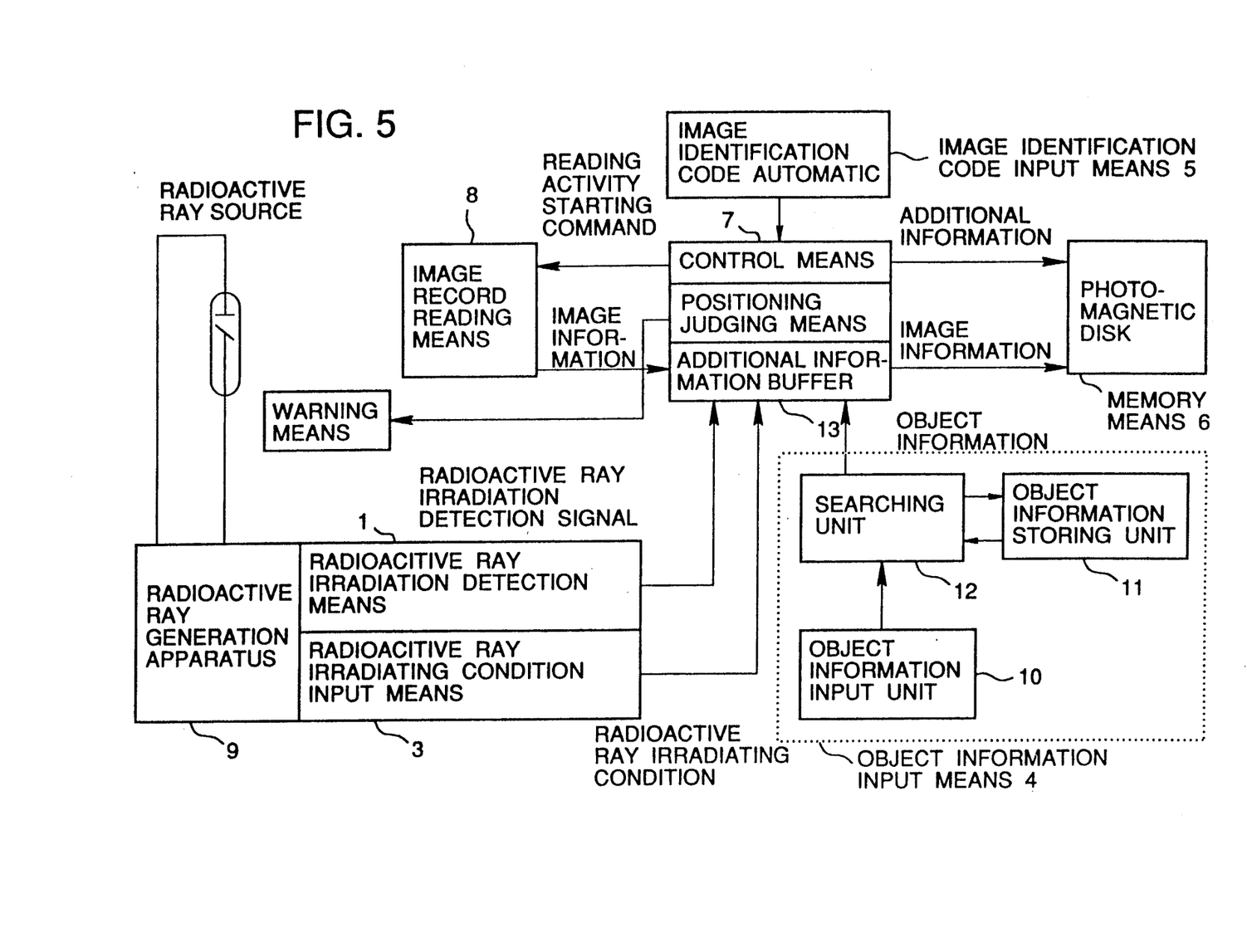
FIG. 5 is a block diagram of the radiographic image recording and reading apparatus relating to Example 3.

FIG. 5 is a block diagram of a radiographic image recording and reading apparatus relating to this example.

This example is structured in such a manner that a positioning judgement means and a warning means are added to the structure of Example 1. In response to the irradiation of radioactive rays, the control means controls the reading operation of radiographic image information and the judging operation of positioning. In the case where the positioning operation has been performed appropriately, the image information is stored in the memory means in such a manner that the image data of appropriate positioning corresponds to the additional information. In the case where the positioning operation has not been performed appropriately, a warning sound is made by the warning means.

EXAMPLE 4

Figure 6:
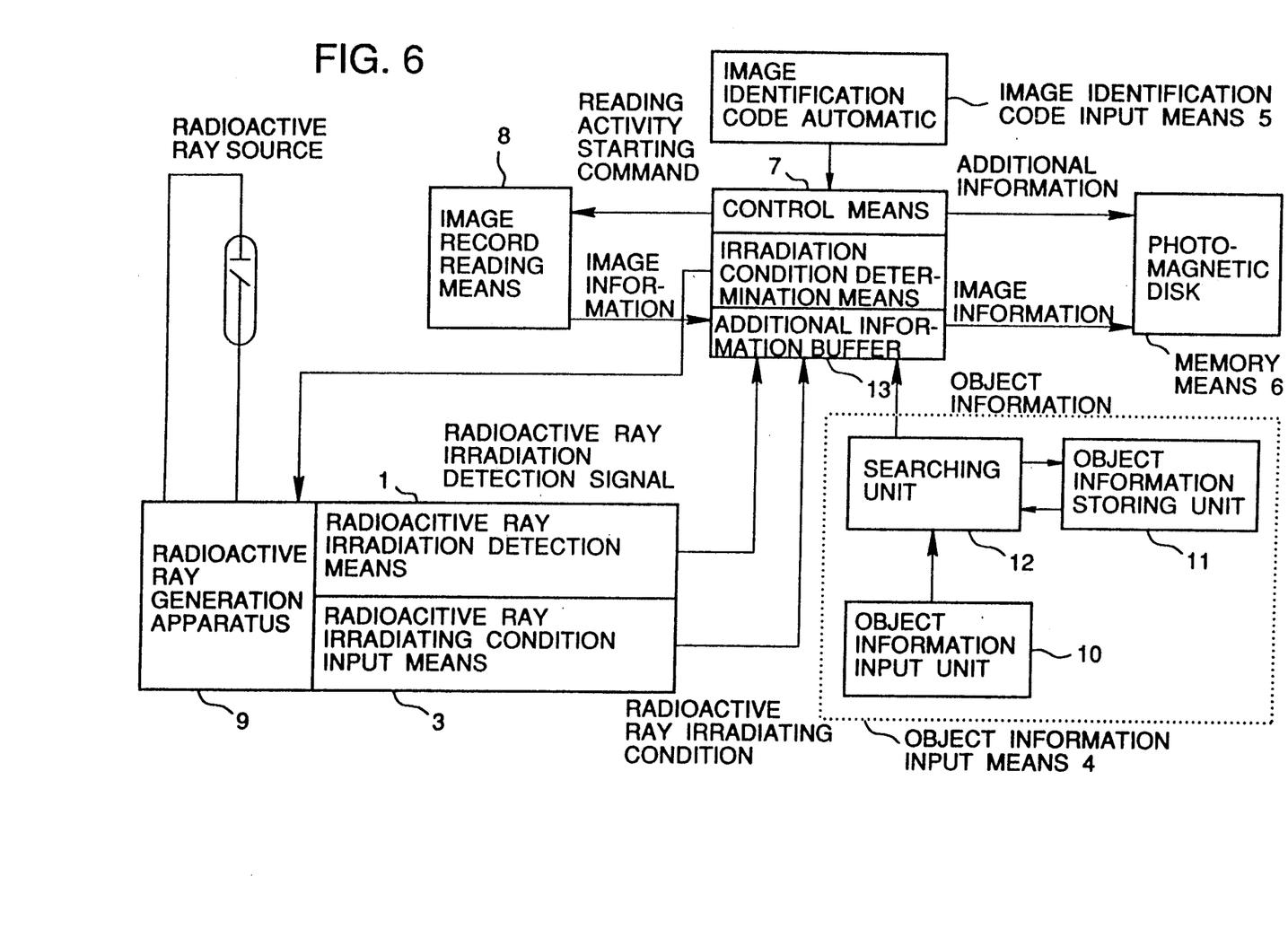
FIG. 6 is a block diagram of the radiographic image recording and reading apparatus relating to Example 4.

FIG. 6 is a block diagram of a radiographic image recording and reading apparatus relating to this example.

This example is structured in such a manner that a radioactive ray irradiation condition determination means is added to the structure of Example 1. The object information includes the height and weight of an object.

The control means is structured so that control can be performed in the following manner: before radioactive rays are irradiated, the radioactive ray irradiation condition determination means determines a radioactive ray irradiation condition according to the data of the height and weight of an object; the determined condition is sent to the radioactive ray generation apparatus so that the radioactive ray irradiation condition can be set; and in response to the irradiation of radioactive rays, the radiographic image information is read, and the image information is stored in the memory means correspondingly to the additional information.

EXAMPLE 5

Figure 7:
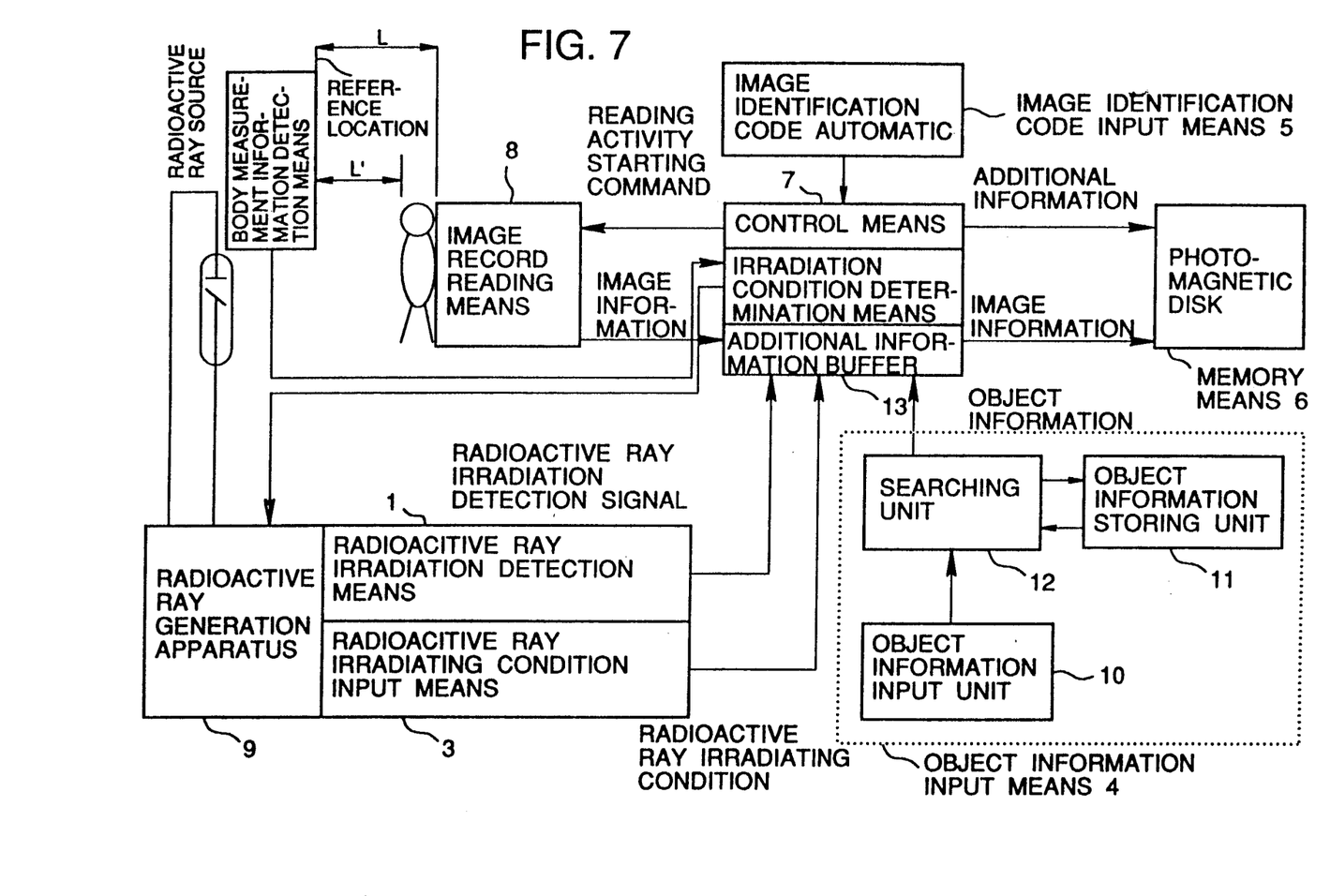
FIG. 7 is a block diagram of the radiographic image recording and reading apparatus relating to Example 5.

FIG. 7 is a block diagram of a radiographic image recording and reading apparatus relating to this example.

This example is structured in such a manner that a radioactive ray irradiation condition determination means and a body measurement information detection means are added to the structure of Example 1. The body measurement information detection means is to measure the body thickness of an object. The body measurement information detection means is structured in the following manner: distance L between the radiographic image recording and reading means and the reference location is previously measured in the case where there is no object; next, distance L' between an object and the reference location is measured; and then the difference between L and L' is found so that the body thickness of the object can be measured.

Before radioactive rays are irradiated, the control means lets the radioactive ray irradiating condition determination means determine the irradiating condition in accordance with the body thickness of the object. The determined condition is sent to the radioactive ray generation apparatus so that the irradiating condition is set. In response to the irradiation of radioactive rays, the radiographic image information is read, and the image information is stored in the memory means correspondingly to the additional information.

As explained above in detail, according to the present invention, a compact radiographic image data reading apparatus can be provided, by which image data and photographing data can be positively linked with each other.

What is claimed is:

1. An apparatus for recording and reading a radiographic image formed by radioactive rays transmitted through an object, said radioactive rays being radiated by irradiating means to said object, said apparatus comprising:
   an image recording and reading means for obtaining radiographic image information, said image recording and reading means including:
   (a) a recording unit including means for recording radiographic image information onto a radiographic image storage panel, wherein said radiographic image storage panel includes a stimulable phosphor layer, and (b) a reading unit including means for scanning said radiographic image storage panel with stimulating light, means for photoelectrically reading said radiographic image information recorded on said radiographic image storage panel, and means for generating said radiographic image information;

additional information input means for generating at least one of a radioactive ray irradiating condition, object information, and image identification code;

memory means for storing said radiographic image information and said additional information;

means for detecting an irradiating operation of said irradiating means, and for generating a detecting signal responsive thereto; and control means, operable responsive to said detecting signal and, including means for controlling said recording unit and said reading unit of said image recording and reading means to scan, read and generate said radiographic image information, said control means further including means for controlling said memory means to store said radiographic image information and said additional information correspondingly to each other.

2. The apparatus of claim 1, wherein said memory means comprises a magneto-optical disk.

3. The apparatus of claim 1, further comprising means for automatically inputting to said additional information input means at least one of said radioactive ray irradiating condition, said object information, and said image identification code.

4. The apparatus of claim 1, further comprising means for generating at least one of a radioactive ray irradiating condition, object information, and image identification code according to a manual operation by an operator.

5. The apparatus of claim 1, further comprising:

positioning judging means for judging a positional relation between the object and the radiographic image recording and reading means responsive to said detecting signal, and for generating a warning signal when a positional failure is judged; and warning means for transmitting a caution signal to an operator of the apparatus responsive to said warning signal.

6. The apparatus of claim 1, wherein said object information includes body measurement information, and wherein said apparatus further comprises:

irradiating condition determination means for determining an irradiating condition of said irradiating means based on the body measurement information; and wherein said control means controls said irradiation condition-determination means so as to determine said irradiation condition before an irradiation by said irradiating means.

7. The apparatus of claim 5, wherein said control means includes means for prohibiting said memory means from storing said radiographic image information and said additional information responsive to said warning signal.

* * * * *